J. F. WHITE.
FOOT PROPELLED VEHICLE.
APPLICATION FILED DEC. 13, 1913.
1,148,419.
Patented July 27, 1915.
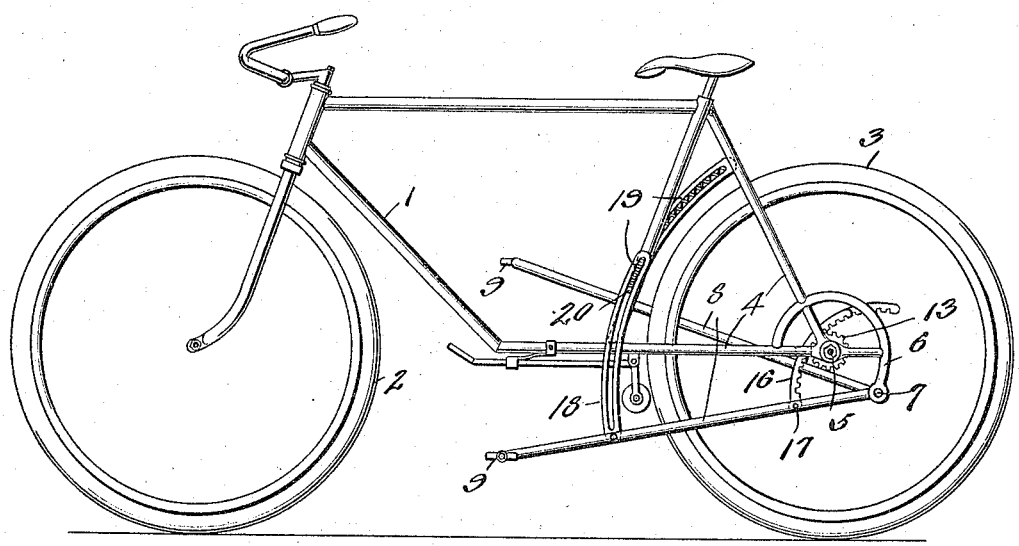
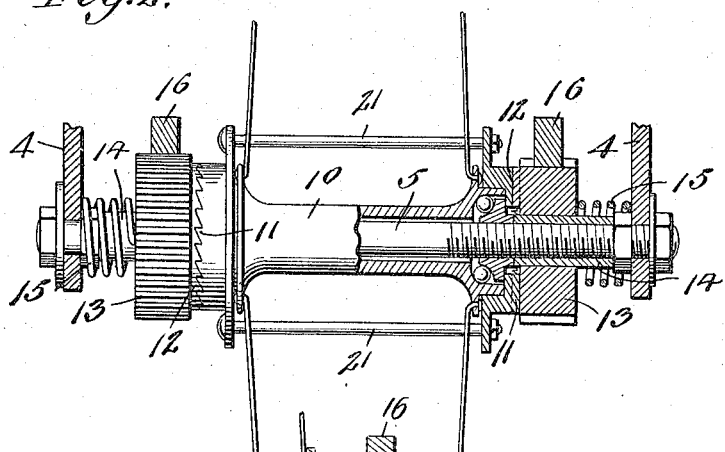
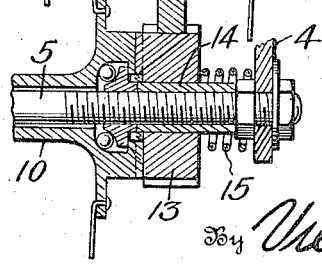
Inventor
J. F. White,
By Victor J. Evans
Attorney
Witnesses

UNITED STATES PATENT OFFICE.

JAMES F. WHITE, OF ROANOKE RAPIDS, NORTH CAROLINA.

FOOT-PROPELLED VEHICLE.

1,148,419.  Specification of Letters Patent.  Patented July 27, 1915.

Application filed December 13, 1913. Serial No. 806,592.

*To all whom it may concern:*

Be it known that I, JAMES F. WHITE, a citizen of the United States, residing at Roanoke Rapids, in the county of Halifax and State of North Carolina, have invented new and useful Improvements in Foot-Propelled Vehicles, of which the following is a specification.

This invention relates to foot propelled vehicles or velocipedes, the object of the invention being to provide such a machine or vehicle with simple, reliable and powerful foot operated propelling mechanism which will overcome dead centers and enable power to be continuously applied to the driving wheel.

With the above and other objects in view, the invention consists in the construction, combination and arrangement of parts, as will be hereinafter more fully described, illustrated and claimed.

In the accompanying drawings:—Figure 1 is a side elevation of a bicycle showing the improved propelling mechanism applied thereto. Fig. 2 is a vertical diametrical section on an enlarged scale through the hub of the driving wheel, showing portions of the frame, the axle, and the pinion and ratchet mechanism; Fig. 3 is a detail section on the same line as Fig. 2 showing the ratchet teeth formed on the hub.

Referring to the drawings 1 designates the frame of a bicycle or velocipede, 2 the front wheel and 3 the rear wheel, the frame 1 being provided with the usual fork arms 4 the rear ends of which carry the stationary axle 5 around which the driving wheel 3 turns.

In carrying out the present invention, the rear fork is formed at opposite sides of the driving wheel 3 with rearward extensions or bracket arms 6 to which are pivotally connected at 7 a pair of pedal levers 8 arranged at opposite sides of the driving wheel and carrying pedals 9 at their forward extremities.

The hub 10 of the driving wheel is provided at its opposite ends with laterally projecting ratchet teeth 11 and coöperating with said teeth 11 are the ratchet teeth 12 of a pair of spur pinions 13, one of said pinions being arranged between each end of the hub and the adjacent fork arm 4 of the machine frame.

In order to adapt the invention to be applied to machines as at present constructed, bearing sleeves 14 are placed over the end portions of the stationary axle 5 and are preferably threaded and screwed tightly thereon so as to remain stationary with the axle. The sleeves 14 provide smooth bearings around which the pinions 13 revolve freely.

Interposed between each of the pinions 13 and the adjacent fork arm 4 of the frame is a coiled expansion spring 15 which yieldingly urges the adjacent pinion toward the wheel hub so as to cause the teeth 12 of the pinion to engage the teeth 11 of the hub. At the same time the spring allows the pinion 13 to move outwardly or away from the hub in order that said pinion may turn in a backward direction.

The pinions 13 are revolved in a forward direction by means of toothed sectors 16, one of said sectors being pivotally connected at 17 to each pedal lever 8. Each sector is held in constant mesh with its respective pinion 13 by any suitable means such as a spring or guide on the machine frame.

In order to retract or uplift the pedal levers 8 after they have been depressed, each of said levers is shown as provided with an arcuate longitudinally slotted hanger bar 18 in which is arranged a lever uplifting or return spring 19 which is inserted between the upper end of the slotted bar 18 and a shoulder or projection 20 on the machine frame, said shoulder or projection 20 being received in the slot of the bar 18 as indicated in Fig. 1.

From the foregoing description taken in connection with the accompanying drawings it will now be seen that the pedal levers 8 may be either simultaneously or alternately depressed to drive the machine and that they are returned to the upper limit of their movement by means of the springs 19. As one of the levers 8 is depressed, it carries with it the toothed sector 16 and therefore rotary motion is imparted to adjacent pinion 13. In such forward rotation of the pinion, the latter, being pressed into engagement with the teeth of the hub by means of the adjacent spring 15, takes up the hub and revolves the driving wheel in a forward direction. As soon as the pedal lever is allowed to move upwardly, the spring 15 yields to permit said pinion to slide on the axle away from the hub and this permits the teeth 11 and 12 to slip over and by each other until said lever is again depressed whereupon the spring 15 again throws the ratchet teeth 11 and 12 into positive driving engagement with each other. Under the relation of parts as hereinabove described, there are no dead centers such as are present in the usual propelling cranks and therefore the full strength of the operator may be applied continuously to the driving wheel. In Fig. 3 I have illustrated the application of the present invention to a new hub, the ratchet teeth 11' being formed integrally with the hub 10. This is, of course, the preferred construction and will be used in the manufacture of the machine. The construction illustrated in Fig. 2 adapts the invention to be applied to machines already constructed, the teeth 11 being formed on flanged members which are secured in clamped relation to the ends of the hubs by any desired number of bolts 21 which pass through the flanges of said members and between the spokes of the wheel as clearly indicated in said Fig. 2.

What I claim is:—

1. In a foot-propelled machine, the combination of a machine frame embodying a fork, a driving wheel mounted in said fork, a stationary axle on which said wheel revolves, ratchet teeth projecting from the end faces of the hub of said wheel, pinions mounted loosely on said axle between the hub and arms of said fork and adapted to slide longitudinally of and revolve upon said axle, ratchet teeth on the inner faces of said pinions to engage the ratchet teeth on the hub, springs acting to yieldingly urge said pinions toward and into engagement with the hub, pedal levers arranged at opposite sides of said driving wheel, and sector gears meshing with said pinions fastened rigidly to and actuated by said pedal levers.

2. In a foot propelled machine, the combination of a machine frame, a driving wheel, pedal levers on opposite sides of the machine fulcrumed at their rear extremities on the frame, driving connections between said levers and driving wheel, and pedal lever raising means embodying arcuate longitudinally slotted bars connected to and extending upwardly from said pedal levers, projections on the machine frame extending into the slots of said bars, and helical springs confined in the slots of said bars and each bearing at one end against one of said projections and at the other end against the end wall of the slot of its respective lever.

In testimony whereof I affix my signature in presence of two witnesses.

JAMES F. WHITE.

Witnesses:
H. F. CHERRY,
Jos. B. GOOCH.

Copies of this patent may be obtained for five cents each, by addressing the "Commissioner of Patents. Washington, D. C."